US012566611B2

(12) United States Patent　　(10) Patent No.: US 12,566,611 B2

Bahirat　　(45) Date of Patent: Mar. 3, 2026

(54) CUSTOMIZABLE AND PROGRAMMABLE CONTROL MECHANISM FOR SINGLE AND MULTICORE PROCESSORS

(71) Applicant: Google LLC, Mountain View, CA (US)

(72) Inventor: Shirish Bahirat, Longmont, CO (US)

(73) Assignee: Google LLC, Mountain View, CA (US)

( * ) Notice: Subject to any disclaimer, the term of this patent is extended or adjusted under 35 U.S.C. 154(b) by 101 days.

(21) Appl. No.: 18/377,454

(22) Filed: Oct. 6, 2023

(65) Prior Publication Data

US 2025/0117225 A1　　Apr. 10, 2025

(51) Int. Cl.
　　*G06F 9/38*　　(2018.01)
(52) U.S. Cl.
　　CPC ................................... *G06F 9/3836* (2013.01)
(58) Field of Classification Search
　　CPC ........ G06F 9/3836; G06F 9/3851; G06F 9/46;
　　　　　　　G06F 9/4881; G06F 9/5038; G06F
　　　　　　　9/5044
　　See application file for complete search history.

(56) References Cited

U.S. PATENT DOCUMENTS

| 5,963,744 | A | 10/1999 | Slavenburg et al. | |
| 7,299,098 | B2 | 11/2007 | Gruenewald et al. | |
| 7,617,494 | B2 * | 11/2009 | Rovati | ................... G06F 9/3879 |
| | | | | 717/149 |

| 10,025,590 | B2 * | 7/2018 | Capps, Jr. | ........... G06F 9/30145 |
| 10,776,156 | B2 | 9/2020 | Koker et al. | |
| 2003/0163671 | A1 * | 8/2003 | Gschwind | ............. G06F 9/3858 |
| | | | | 712/214 |
| 2009/0228686 | A1 * | 9/2009 | Koenck | ............... G06F 15/7842 |
| | | | | 712/E9.004 |
| 2015/0227448 | A1 * | 8/2015 | Goel | ......................... G06F 8/52 |
| | | | | 717/131 |
| 2016/0179747 | A1 | 6/2016 | Wei et al. | |
| 2021/0103467 | A1 | 4/2021 | Kamenetskaya et al. | |
| 2022/0114015 | A1 * | 4/2022 | Lee | ....................... G06F 9/4881 |

OTHER PUBLICATIONS

Extended European Search Report for European Patent Application No. 24204283.6 dated Mar. 5, 2025. 10 pages.

* cited by examiner

*Primary Examiner* — Farley Abad
(74) *Attorney, Agent, or Firm* — Lerner David LLP

(57) ABSTRACT

Aspects of the disclosed technology include techniques and mechanisms for using a customizable and programmable control mechanism for single and multicore processors to schedule and execute one or more sets of instructions associated with different workloads. The customizable control mechanism may manage the one or more sets of instructions to be executed and may dynamically determine a priority order in which the one or more sets of instructions should be executed. The priority order may be based on workload-specific preferences and workload-specific requirements associated with each set of instructions. The customizable control mechanism may instruct one or more processors to execute the one or more sets of instructions in accordance with the determined priority order.

16 Claims, 6 Drawing Sheets

Computing Device 110

Memory(s) 130

Instructions 140

Data 150

Central Processing Unit (CPU) 120

I/O Devices 160a-160n

100

500

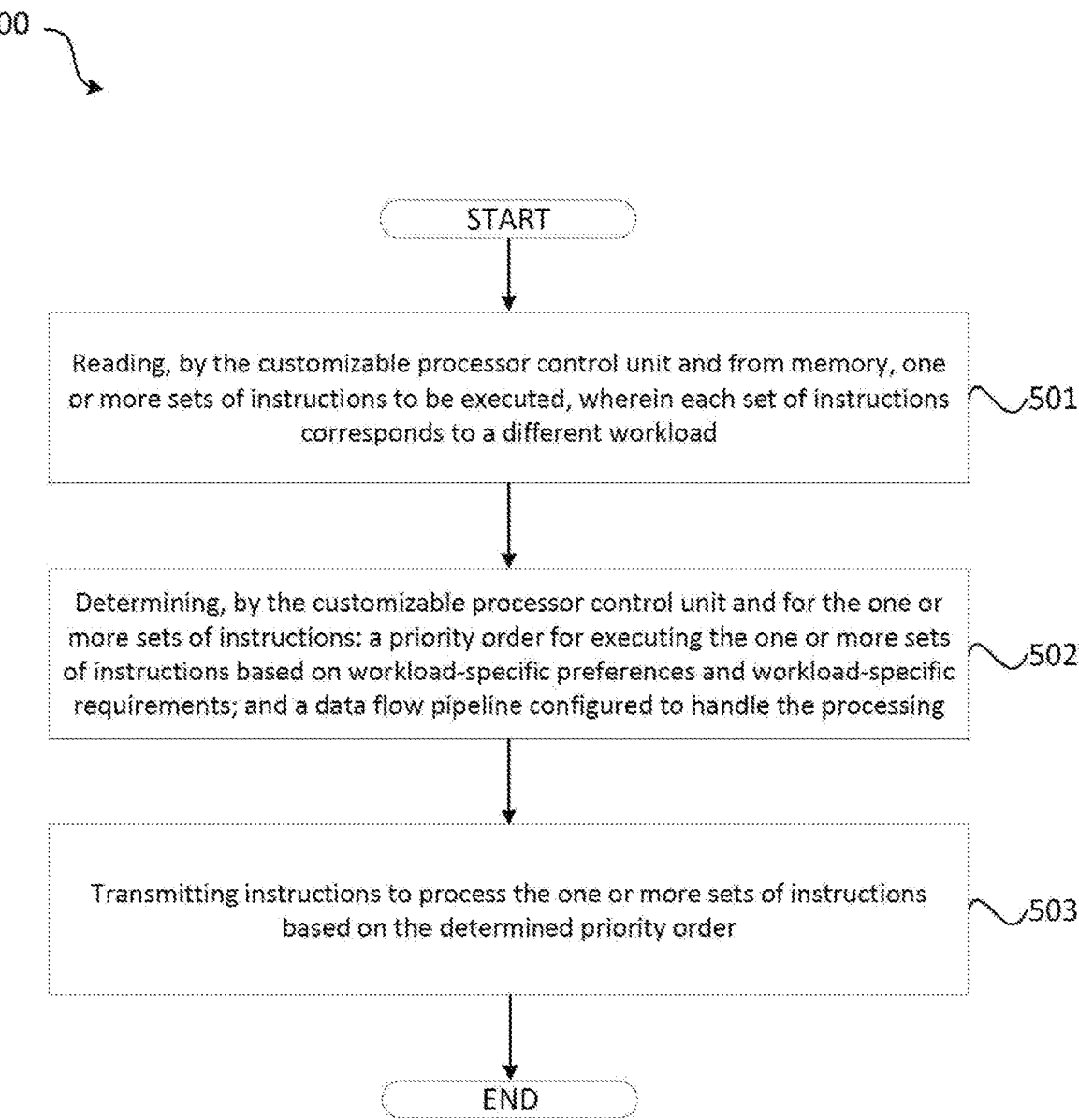

START

Reading, by the customizable processor control unit and from memory, one or more sets of instructions to be executed, wherein each set of instructions corresponds to a different workload ⁓501

Determining, by the customizable processor control unit and for the one or more sets of instructions: a priority order for executing the one or more sets of instructions based on workload-specific preferences and workload-specific requirements; and a data flow pipeline configured to handle the processing ⁓502

Transmitting instructions to process the one or more sets of instructions based on the determined priority order ⁓503

END

FIG. 5

CUSTOMIZABLE AND PROGRAMMABLE CONTROL MECHANISM FOR SINGLE AND MULTICORE PROCESSORS

BACKGROUND

The computational power of technology may steadily increase overtime. However, the current generation of technology may be experiencing a computational performance plateau since clock speeds and a rate of computational performance per watt have undergone little to no change. To improve computational performance efficiency, custom CPU architecture and accelerators may be needed to improve the efficiency of specific workloads or algorithms while maintaining a balance between general purpose and special purpose architectures and while maintaining generalization with minimal impact on a mainline software stack.

Current CPU architectures can be generalized into two categories—dedicated control per core and centralized control. Under the dedicated control per core CPU architecture, the CPU may be a general purpose CPU. A single control unit may drive a single processor. Under the centralized control CPU architecture, the CPU may be a GPU configured to perform parallel operations. A single control unit may drive one or more GPU cores, where the one or more GPU cores may include multiple processors. Under either architecture, the control unit may be configured to orchestrate instruction execution and data paths, to schedule out of order instruction execution, and to manage hazards that may affect performance expectations. While the control units in modern CPUs may be complex and configured for maximum efficiency, the software executing on modern CPUs may vary significantly. A number of instructions executed by a CPU control unit for each cycle may be below a practical observed performance level because a general purpose control unit might not be configured to optimize the workload of a software stack in its entirety. For example, a database workload may require a different instruction execution sequence than computation intensive workloads or storage intensive workloads. Therefore, CPU control units might not be configured to optimize the instruction execution of a software stack without requiring a change in the software.

SUMMARY

Aspects of the disclosed technology include methods, apparatuses, systems, and computer-readable media for a customizable and programmable control mechanism for single and multicore processors to schedule and execute one or more sets of instructions associated with different workloads. The customizable processor control unit may read the one or more sets of instructions to be executed, where each set of instructions may be associated with a workload. A workload may indicate a categorization or grouping of one or more different operations executing with an application or program on a computing device. The customizable processor control unit may dynamically determine a priority order in which the one or more sets of instructions should be executed.

To do so, the customizable processor control unit may analyze the one or more sets of instructions and the corresponding workloads to determine workload-specific preferences and workload-specific requirements associated with each set of instructions. The customizable processor control unit may weigh computational and performance preference and requirements of a set of instructions against all remaining sets of instructions in order to determine the priority order in which the one or more sets of instructions should be executed. The customizable processor control unit may transmit the determined priority order to one or more processors within the computing device that may be configured to carry out execution of the one or more sets of instructions. In particular, the customizable processor control unit may instruct the one or more processors to execute the one or more sets of instructions according to the determined priority order.

The customizable processor control unit may dynamically determine a new priority order in which instructions should be executed, for example, each time a read transaction is executed on a memory storing the one or more sets of instructions to be executed.

One aspect of the disclosure provides for a method for processing workload instructions using a customizable processor control unit in a central processing unit (CPU), the method comprising: reading, by the customizable processor control unit and from memory, one or more sets of instructions to be executed, wherein each set of instructions corresponds to a different workload; determining, by the customizable processor control unit and for the one or more sets of instructions: a priority order for executing the one or more sets of instructions based on workload-specific preferences and workload-specific requirements; and a data flow pipeline configured to handle the processing; and transmitting instructions to process the one or more sets of instructions based on the determined priority order.

According to some examples, the method further comprises determining, by the customizable processor control unit and for the one or more sets of instructions: an input/output (I/O) operation sequence configured to handle specific workloads; and a memory operation sequence configured as needed by workload optimization.

In the foregoing embodiments, the customizable processor control unit controls a single core CPU architecture or a multi-core CPU, graphics processing unit (GPU), tensor processing unit (TPU), or variable processing unit (xPU) architecture.

In the foregoing embodiments, a workload corresponds to an application running on a computing device, and the computing device is configured to generate the one or more sets of instructions.

According to some examples, the method further comprises determining, by the customizable processor control unit, the workload-specific preferences comprising: conditions for allowing access to memory spaces storing data needed to process the one or more sets of instructions; conditions for satisfying operation performance thresholds; conditions for scheduling execution of the one or more sets of instructions; and conditions for maintaining an overall operation configuration.

According to some examples, the method further comprises determining, by the customizable processor control unit, the workload-specific requirements comprising: one or more data storage configurations needed for execution of the one or more sets of instructions; throughput optimization for input/output (I/O) processors associated with the one or more sets of instructions; one or more control path configurations; and a level of parallelism needed for execution of the one or more sets of instructions.

In the foregoing embodiments, the data flow pipeline configured to handle the processing corresponds to: one or more arithmetic logic units (ALUs) configured to execute the one or more sets of instructions; and one or more memory locations configured to store data that is required to execute the one or more sets of instructions and to store one or more outputs of an executed set of instructions.

According to some examples, the method further comprises transmitting, by the customizable processor control unit, instructions to release the one or more outputs to a computing device that requested execution of the set of instructions.

According to some examples, the method further comprises scheduling, by the customizable processor control unit, execution of the one or more sets of instructions based on the priority order.

In the foregoing embodiment, determining the priority order for executing the one or more sets of instructions comprises comparing, for each set of instructions: computational and performance workload-specific preferences; and computational and performance workload-specific requirements.

Another aspect of the disclosure provides for a computing device for scheduling execution of workload instructions, the computing device comprising: a memory; and a central processing unit (CPU) comprising a customizable processor control unit and an arithmetic logic unit (ALU), wherein the customizable processor control unit is configured to: read, from memory, one or more sets of instructions to be executed, wherein each set of instructions corresponds to a different workload; determine, for the one or more sets of instructions: a priority order for executing the one or more sets of instructions based on workload-specific preferences and workload-specific requirements; and a data flow pipeline configured to handle the processing; and transmit, to the ALU, instructions to process the one or more sets of instructions based on the determined priority order.

In the foregoing embodiment, a workload corresponds to an application running on the computing device, and the computing device is configured to generate the one or more sets of instructions.

According to some examples, the customizable processor control unit is further configured to determine the workload-specific preferences comprising: conditions for allowing access to memory spaces storing data needed to process the one or more sets of instructions; conditions for satisfying operation performance thresholds; conditions for scheduling execution of the one or more sets of instructions; and conditions for maintaining an overall operation configuration.

According to some examples, the customizable processor control unit is further configured to determine the workload-specific requirements comprising: one or more data storage configurations needed for execution of the one or more sets of instructions; throughput optimization for input/output (I/O) processors associated with the one or more sets of instructions; one or more control path configurations; and a level of parallelism needed for execution of the one or more sets of instructions.

According to some examples, the customizable processor control unit is further configured to transmit, to the ALU, instructions in order or out of order to release one or more outputs of an executed set of instructions to the computing device that requested execution of the set of instructions.

According to some examples, the customizable processor control unit is further configured to schedule execution of the one or more sets of instructions based on the priority order.

In the foregoing embodiments, determining the priority order for executing the one or more sets of instructions further causes the customizable processor control unit to compare, for each set of instructions: computational and performance workload-specific preferences; and computational and performance workload-specific requirements.

Another aspect of the disclosure provides for a non-transitory computer readable storage medium storing instructions that, when executed by a customizable processor control unit, cause the customizable processor control unit to: read, from memory, one or more sets of instructions to be executed, wherein each set of instructions corresponds to a different workload; determine, for the one or more sets of instructions: a priority order for executing the one or more sets of instructions based on workload-specific preferences and workload-specific requirements; and a data flow pipeline configured to handle the processing; and transmit instructions to process the one or more sets of instructions based on the determined priority order.

According to some examples, the customizable processor control unit is further configured to determine the workload-specific preferences comprising: conditions for allowing access to memory spaces storing data needed to process the one or more sets of instructions; conditions for satisfying operation performance thresholds; conditions for scheduling execution of the one or more sets of instructions; and conditions for maintaining an overall operation configuration.

According to some examples, the customizable processor control unit is further configured to determine workload-specific requirements comprising: one or more data storage configurations needed for execution of the one or more sets of instructions; throughput optimization for input/output (I/O) processors associated with the one or more sets of instructions; one or more control path configurations; and a level of parallelism needed for execution of the one or more sets of instructions.

BRIEF DESCRIPTION OF THE DRAWINGS

FIG. 5 illustrates a flow diagram for an example method of processing workload requests using the customizable control unit, in accordance with aspects of the disclosure.

DETAILED DESCRIPTION

The technology described herein addresses a customizable and programmable control mechanism for multicore processors. A processor within a computing device may receive, from a program or application running on the computing device, binary bits indicating instructions to be decoded and executed to perform operations associated with the program or application. The computing device may receive instructions via a workload pipeline. The workload pipeline may transmit one or more sets of instructions at a time. The flow of instructions within the pipeline may be managed by a customizable and programmable control unit, referred to herein as a customizable control unit. The customizable control unit may be configured to maximize the instruction execution, per cycle, of a software stack without requiring a change in the software.

One method of customizing hardware and hardware accelerators includes designing customized parallel architectures for particular algorithms or workloads where a number of steps that may be executed using custom hardware is greater than a number of steps that may be executed in a conventional CPU design. The customized parallel architectures may include streaming architectures, such as GPUs, and systolic array mechanisms, implemented in some accelerators, such as tensor processing units (TPUs). The customized parallel architectures may be used to achieve higher computation throughput relative to that of general purpose processors by allowing direct communication or data flow between customized functional units instead of allowing each processing element to communicate. Highly customized and optimized high throughput architectures may be beneficial during the implementation of a limited number of workloads (or algorithms), such as the workloads associated with applications that experience network congestion. However, upon changing the workload to be executed to, for example, workloads associated with applications that might not experience network congestion, the customized architecture might not be necessary.

The customizable control unit described herein may eliminate the need for customized data flow between functional units. Instead, the customizable control unit (or one or more different customizable control units) may be configured in accordance with instructions needed for the execution of specific workloads. The customizable control unit may be configured to prioritize instructions for different workloads within a software stack, to schedule the instructions for processing at a rate that manages memory access in accordance with different workload-specific requirements and different workload-specific preferences, and to load balance a CPU front end and CPU backend in accordance with different workload characteristics.

Figure 1:
FIG. 1 illustrates an example computing device configuration comprising a customizable control unit, in accordance with aspects of the disclosure.

FIG. 1 illustrates an example computing device configuration comprising a customizable control unit, in accordance with aspects of the disclosure. As illustrated in FIG. 1, computing device 110 may include central processing unit (CPU) 120 and memory(s) 130 (referred to herein as memory 130). Memory 130 may include instructions 140 and data 150. Though not pictured in FIG. 1, in some implementations, computing device 110 may include one or more additional processors, such as graphic processing units (GPUs), field-programmable gate arrays (FPGAs), and/or application-specific integrated circuits (ASICs).

CPU 120 may be configured to directly communicate with memory 130. In particular, CPU 120 may execute read transactions on memory 130, where one or more sets of instructions may correspond to applications and programs running on computing device 110. CPU 120 may parse the one or more sets of instructions read from memory 130 and may generate an instruction execution specification. The instruction execution specification may outline a priority order in which the one or more sets of instructions should be executed. In particular, the instruction execution specification may indicate a priority level of each set of instructions, where the priority level may indicate an order in which the one or more sets of instructions should be processed and executed. Further, the instruction execution specification may indicate a data flow pipeline configured to handle the processing of each set of instructions.

In some implementations and for each set of instructions, the instruction execution specification may identify a workload that corresponds to the set of instructions. A workload may be categorizations or groupings of different operations that CPU 120 may be configured to process, where the different operations may correspond to different programs or applications running on computing device 110. In some implementations, the workloads may include simultaneous multithreading (SMT) operations, pipelined multi-vector load store operations, confidential computation operations, operations that use systolic arrays, operations that use diastolic arrays, algorithmic optimization operations, hybrid system operations, virtual machine (VM) enhancement operations, scheduler operations, memory access operations, multi-stream GPU operations, or the like. The workload examples discussed herein are for illustration purposes only, not limitation. The instruction execution specification may further identify workload-specific preferences and workload-specific requirements, which may be used to determine the priority order in which the one or more sets of instructions should be processed.

CPU 120 may transmit instructions to the components therein to execute the one or more sets of instructions in accordance with the instruction execution specification. The components of CPU 120 and different configurations of CPU 120 are discussed in further detail in FIGS. 2-4.

Returning to FIG. 1, CPU 120 may be configured to directly communicate with memory 130. In some implementations, the communication may be implemented as a device-to-device communication scheme using a bus, a general purpose input and output (GPIO), a serial peripheral interface (SPI), a mobile industry processor interface (MIPI), or the like.

Memory 130 may store information accessible by CPU 120, including instructions 140 that CPU 120 may process and schedule for execution. Memory 130 may also include data 150 that may be retrieved, read, and used by CPU 120 during the execution of instructions 140. Memory 130 may be a type of non-transitory computer readable medium capable of storing information accessible by CPU 120, such as volatile and non-volatile memory. When implemented as volatile memory, memory 130 may correspond to at least one of RAM, DRAM, SRAM, SDRAM, MRAM, RRAM, FeRAM, or the like. When implemented as non-volatile memory, memory 130 may correspond to at least one of ROM, PROM, EPROM, EEPROM, flash memory, PRAM, MRAM, RRAM, FRAM, or the like. In some implementations, memory 130 may be implemented in the form of HDD, SSD, SD, micro-SD, or a combination thereof.

Instructions 140 may include one or more instructions that, when processed by CPU 120, cause CPU 120 to determine a priority order in which actions defined by instructions 140 should be performed. In particular, instructions 140 may be read from memory 130 by CPU 120 through one or more read transactions. As described in further detail below, instructions 140 may be parsed, analyzed, and scheduled for processing by CPU 120. Instructions 140 may correspond to different workloads running on computing device 110. Instructions 140 may be stored in object code format for direct processing by CPU 120, or in other formats including interpretable scripts or collections of independent source code modules that are interpreted on demand or compiled in advance.

Data 150 may be read, stored, or processed by CPU 120 in accordance with the instructions. Data 150 may be stored in computer registers, in a relational or non-relational database as a table having a plurality of different fields and records, or as JSON, YAML, proto, or XML documents. Data 150 may also be formatted in a computer-readable format such as, but not limited to, binary values, ASCII, or Unicode. Moreover, data 150 may include information sufficient to identify relevant information, such as numbers, descriptive text, proprietary codes, pointers, references to data stored in other memories, including other network locations, or information that is used by a function to calculate relevant data. In some implementations, data 150 may be information associated with different workloads, information needed to execute the instructions associated with the different workloads, or the like.

As illustrated in FIG. 1, computing device 110 may be configured to communicate with input and output (I/O) devices 160a-160n. I/O devices 160a-160n may be any mechanism or technique for requesting the execution of one or more operations corresponding to one or more programs or applications running on computing device 110. In some implementations, requesting the execution of the one or more operations may include generating, by I/O devices 160a-160n, the one or more sets of instructions, such as instructions 140. I/O devices 160a-160n may correspond to one of a keyboard, mouse, display interface, touchscreen display interface, microphone, sensor, or the like. The I/O devices discussed herein are for illustration purposes only and are not meant to be limiting as additional or alternative I/O devices may be used to request the execution of the one or more operations associated with one or more workloads.

In some implementations, the communication between computing device 110 and I/O devices 160a-160n may be implemented as a device-to-device communication scheme using a bus, a general purpose input and output (GPIO), a serial peripheral interface (SPI), a mobile industry processor interface (MIPI), or the like.

Figure 2:
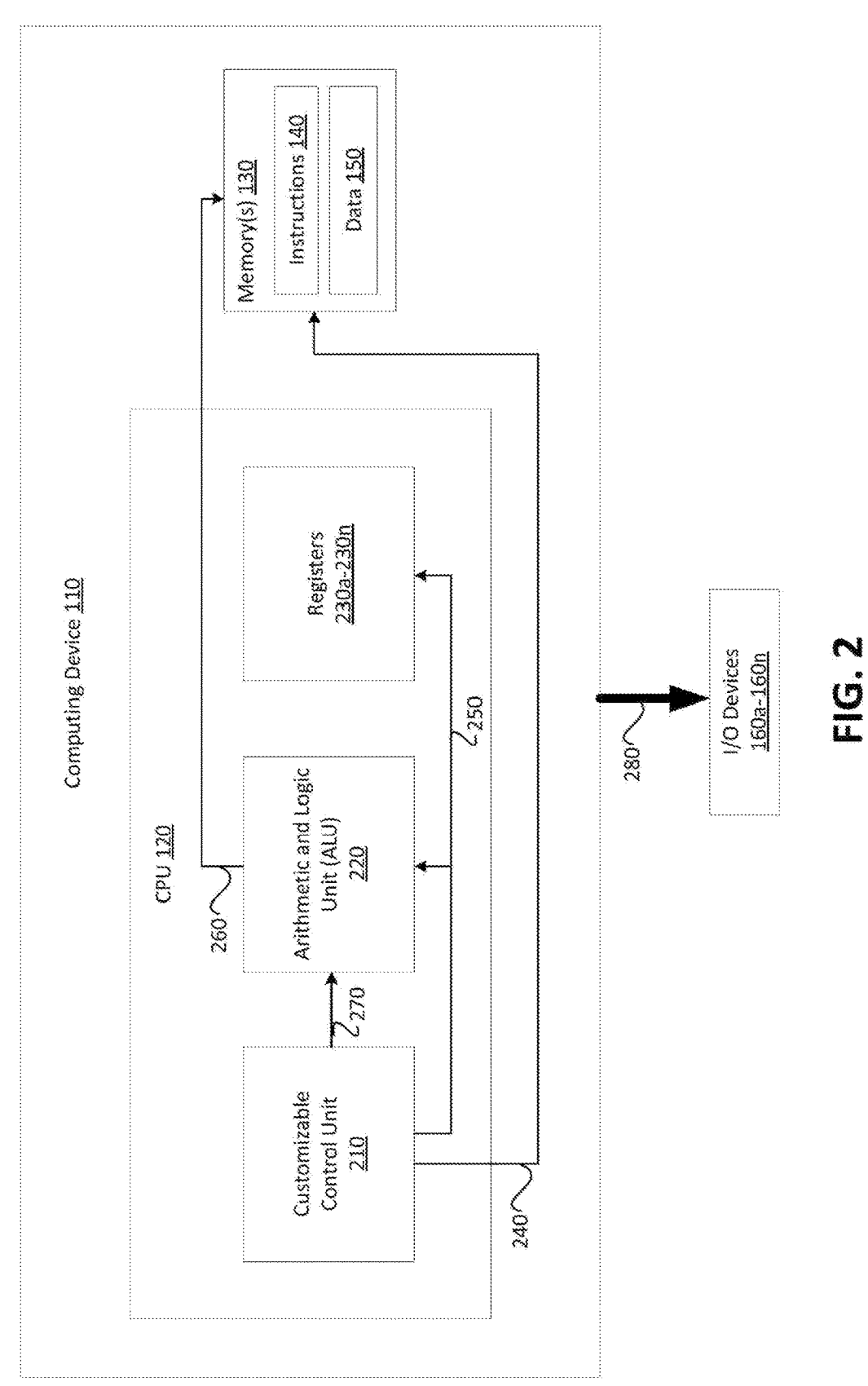
FIG. 2 illustrates an example single-core CPU configuration comprising the customizable control unit, in accordance with aspects of the disclosure.

FIG. 2 illustrates an example single-core CPU configuration comprising the customizable control unit, in accordance with aspects of the disclosure. As illustrated in FIG. 2, CPU 120 may be configured according to a single-core configuration 200 where a single control unit controls CPU 120. In such implementations, CPU 120 may include customizable control unit 210, arithmetic and logic unit (ALU) 220, and registers 230a-230n.

Figure 3:
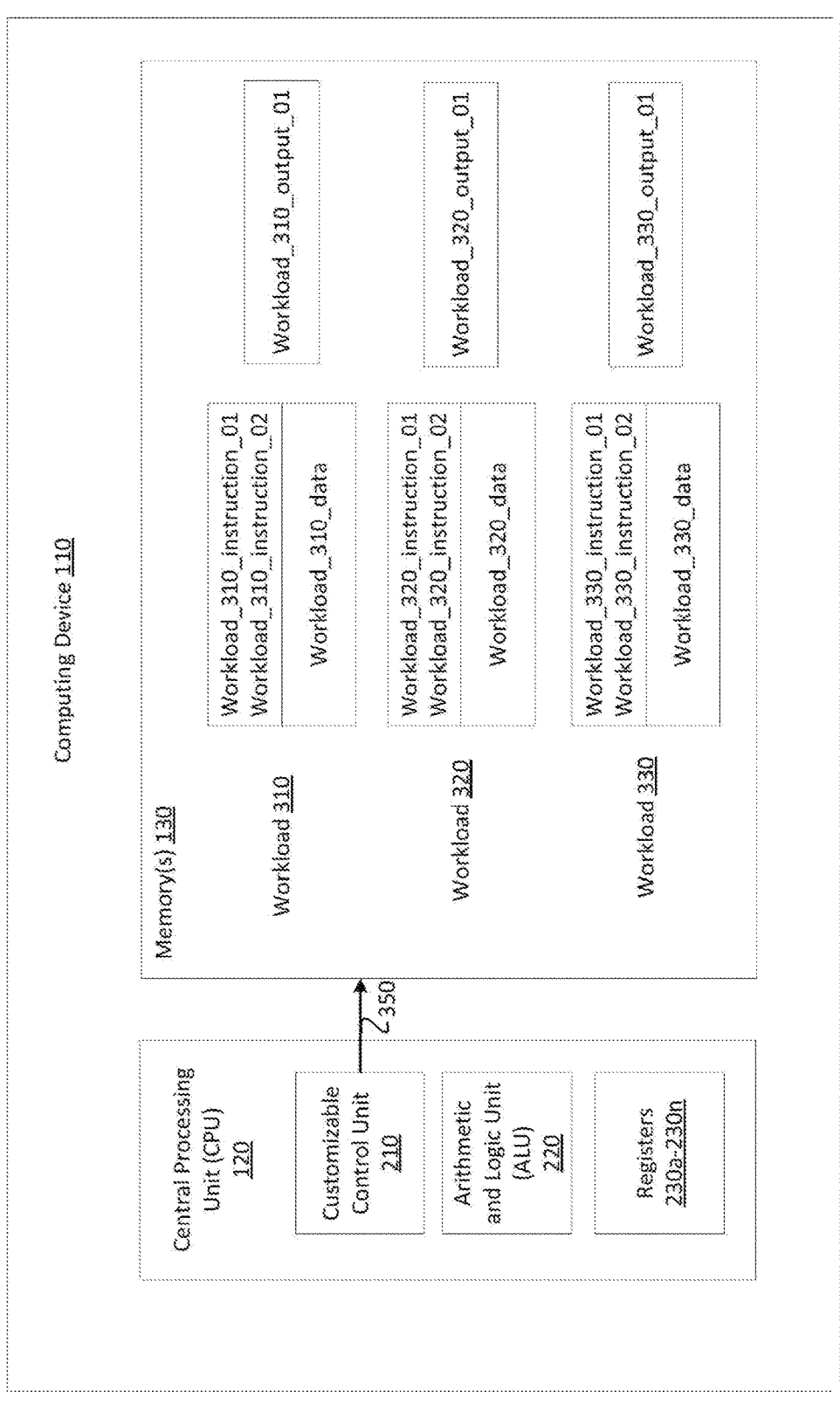
FIG. 3 illustrates example instructions and data that the customizable control unit may use to execute different workloads, in accordance with aspects of the disclosure.

Customizable control unit 210 may be configured to execute read transactions on memory 130 to read one or more sets of instructions stored within instructions 140, as illustrated by arrow 240. Customizable control unit 210 may parse the one or more sets of instructions to identify an application or program to which a set of instructions corresponds, a workload associated with the set of instructions, and one or more operations to be executed based on the set of instructions. Further, customizable control unit 210 may execute one or more read transactions on data 150 to identify the data that may be needed to execute the one or more sets of instructions. FIG. 3 illustrates example instructions and data that the customizable control unit may use to execute different workloads, in accordance with aspects of the disclosure.

As illustrated by arrow 350 in FIG. 3, customizable control unit 210 may execute read transactions on memory 130 to read instructions 140 and data 150 stored therein. For example, based on a read transaction executed on memory 130, customizable control unit 210 may determine that memory 130 includes six instructions to be executed, where the six instructions are associated with three different workloads, namely workload 310, workload 320, and workload

330. Customizable control unit 210 may determine that the instructions to be executed for workload 310 are Workload_310_instruction_01 and Workload_310_instruction_02, that the instructions to be executed for workload 320 are Workload_320_instruction_01 and Workload_320_instruction_02, and that the instructions to be executed for workload 330 are Workload_330_instruction_01 and Workload_330_instruction_02. While FIG. 3 illustrates three example workloads, more or less than workloads may be stored in memory 130. Three workloads are described for illustration purposes only, not limitation.

Each of workloads 310-330 may correspond to a different application/program running on computing device 110 and may correspond to different operations to be executed within the different applications/programs. While not an exhaustive list of workloads, some workloads may include simultaneous multithreading (SMT) operations, pipelined multi-vector load store operations, confidential computation operations, operations that use systolic arrays, operations that use diastolic arrays, algorithmic optimization operations, hybrid system operations, virtual machine (VM) enhancement operations, scheduler operations, memory access operations, multi-stream GPU operations, or the like. The workload examples discussed herein are for illustration purposes only, not limitation.

Each workload may require data in order to execute the set of instructions that corresponds to the workload. As illustrated in FIG. 3, customizable control unit 210 may read, from memory 130 and based on the same or a different read transaction, data associated with each of workloads 310-330. In particular, customizable control unit 210 may read Workload_310_data, Workload_320_data, and Workload_330_data. As described in detail below, customizable control unit 210 may instruct ALU 220 to use the workload data within data 150 when executing the one or more sets of instructions.

Based on identifying a workload associated with a set of instructions and the one or more operations to be executed, customizable control unit 210 may generate an instruction execution specification. In some implementations, the instruction execution specification may be a series of instructions in the form of binary bits that are transmitted to ALU 220 and that instruct ALU 220 to execute the one or more sets of instructions read from memory 130 in a prioritized order, as described below. In some implementations, the instruction execution specification may be stored in object code format for direct processing by ALU 220, or in other formats including interpretable scripts or collections of independent source code modules that are interpreted on demand or compiled in advance.

The instruction execution specification may outline each set of instructions read by customizable control unit 210 from memory 130 and, by extension, each set of instructions to be executed by CPU 120. The instruction execution specification may also indicate data read from data 150 that may be needed to execute each set of instructions. Further, the instruction execution specification may indicate a priority order in which each set of instructions read from memory 130 should be executed. In some implementations, the priority order in which instructions should be executed may be programmed into customizable control unit 210 using, for example, microcode. For example, customizable control unit 210 may be configured to prioritize instructions associated with higher priority workloads over instructions associated with lower priority workloads. Consequently, customizable control unit 210 may use the microcode programmed therein to generate the instruction execution specification. In such instances, the instruction execution specification that is shared with ALU 220 may match the microcode.

In some implementations, customizable control unit 210 may be configured to dynamically determine the priority level of a set of instructions on a case by case basis based on determining workload-specific preferences and workload-specific requirements of the workload to which the set of instructions corresponds. Workload-specific preferences may indicate conditions that may be requested to customize the processing or the execution of a set of instructions. Workload-specific preferences may be determined by an entity associated with computing device 110, such a user, an enterprise organization, or the like. In some implementations, workload-specific preferences may include conditions for allowing access to memory spaces storing data 150 needed to process the set of instructions, conditions for denying access to the memory spaces storing data 150, and conditions for satisfying operation performance thresholds. Operation performance thresholds may identify minimum, maximum, or preferred values of different performance metrics, such as a throughput level, a quality of service, a level of parallelism, a number of ALUs needed to process the set of instructions, a number of vector units needed to process the workload, or the like. In some implementations, the operation performance thresholds may identify preferred optimization values and/or settings for processing the workloads. The operation performance thresholds discussed herein are not an exhaustive list and are described for illustration purposes only, not limitation.

In some implementations, the workload-specific preferences may include conditions for determining when hardware structures processing data, such as systolic arrays, may be needed to process a workload. For example, workload-specific preferences may indicate conditions for configuring data structures and/or frameworks within which artificial intelligence applications and/or programs may conduct matrix operations or other operations executed in different neural networks. In some implementations, workload-specific preferences may include conditions for maintaining performance and security thresholds within virtual machine computing environments and conditions for determining a scheduling scheme that may be used to schedule the execution of the workloads, such as a fair scheduling scheme, a weighted round robin scheduling scheme, or the like. Further, in some implementations, workload-specific preferences may include conditions for configuring GPU multi-streaming and heterogeneous workload executions, conditions for configuring data flow pipelines to process the workloads, customizing different data flow configurations, and customizing packet processing configurations. The workload-specific preferences described herein do not constitute an exhaustive list and are described for illustration purposes only, not limitation.

In some implementations, the workload-specific preferences may be programmed into customizable control unit 210 using, for example, microcode. However, in some implementations, customizable control unit 210 may determine the workload-specific preferences based on historic workload processing and execution. In particular, customizable control unit 210 may read, from memory 130, historic workload processing and workload execution configurations to determine how to process and execute current workload requests. Further still, in some implementations, customizable control unit 210 may dynamically determine the workload-specific preferences based on a number of additional workloads within memory 130 to be executed, a processing capacity of CPU 120, a number of data flow pipelines available to process and handle execution of the requested workloads, or the like.

As indicated above, the priority order in which a set of instructions may be executed may also be based on workload-specific requirements. Workload-specific requirements may indicate conditions that may be required for execution of the sets of instructions associated with the different workloads indicated in memory 130. Workload-specific requirements may be determined based on performance capacities and computational thresholds of CPU 120 and/or the applications and programs running the workloads associated with the sets of instructions. In some implementations, workload-specific requirements may include one or more data storage configurations needed for execution of a set of instructions, throughput optimization for I/O devices such as I/O devices 160a-160n associated with the set of instructions, one or more control path configurations, and a level of parallelism needed for execution of the set of instructions. The one or more control path configurations may indicate conditions for allowing or denying access to specific memory locations containing at least one of a set of instructions associated with a workload or data that may be needed to execute the set of instructions. Further, in some implementations, the one or more control path configurations may include determining whether at least one instruction (and an operation indicated therein) associated with a workload requires access to the data associated with the workload in order for the workload to be executed.

In some implementations, the workload-specific requirements may include conditions for multiplexing a front end when multiple streams of instructions (or different sets of instructions) are scheduled for simultaneous execution, conditions for communicating load and store operations for vector operations requiring a multi-vector load store pipeline, conditions for configuring diastolic arrays to synthesize high level specifications of applications or programs that include finite state machines to maximize an average throughput, and conditions for determining optimal workload deployment based on workload-specific optimization requirements and workload-specific control path configurations. In some implementations, workload-specific requirements may include conditions for executing one or more workloads in wide, narrow, and/or hybrid systems based on optimization requirements of each workload, costs of each workload execution, and a quality of service of each workload. The workload-specific requirements described herein do not constitute an exhaustive list and are described for illustration purposes only, not limitation.

Customizable control unit 210 may use the determined workload-specific preferences and workload-specific requirements to generate the instruction execution specification. Customizable control unit 210 may weigh the computational and performance preferences and requirements of a workload against that of other workloads in memory 130 awaiting execution. In doing so, customizable control unit 210 may consider a number of data flow pipelines or CPU pipelines available to handle the execution of the one or more workloads indicated in memory 130. In some implementations, customizable control unit 210 may further consider a number of instructions that may be executed each clock cycle to maximize a number of instruction executions per cycle. Customizable control unit 210 may balance the computational limits of each clock cycle against storage limits of memory 130 to ensure sufficient memory to record executed workloads. In some implementations, customizable control unit 210 may prioritize the one or more sets of instructions based on memory access requirements of each workload. Further, in some implementations, customizable control unit 210 may prioritize the one or more sets of instructions based on load balancing the front end and back end of CPU 120.

As indicated above, in some implementations, the instruction execution specification may include a series of instructions for executing the one or more set of instructions associated with the one or more workloads in memory 130. In particular, the instruction execution specification may indicate the priority order in which the one or more sets of instructions should be executed and may indicate workload-specific preferences and workload-specific requirements to be satisfied during execution of the one or more sets of instructions.

Returning to FIG. 2, customizable control unit 210 may transmit the instruction execution specification, as indicated by arrow 250. In some implementations, customizable control unit 210 may transmit the instruction execution specification directly to ALU 200. Further, in some implementations, customizable control unit 210 may write the instruction execution specification to registers 230a-230n. Registers 230a-230n may be configured to pass data to one or more processors within CPU 120, such as ALU 220.

In some implementations, the instruction execution specification may instruct ALU 220 to execute one or more read transactions on memory 130 to retrieve the one or more sets of instructions to be executed and the data that may be needed for execution of the one or more sets of instructions. ALU 220 may be configured to execute the one or more sets of instructions based on the priority order indicated in the instruction execution specification. ALU 220 may write to memory 130 any outputs generated during the execution of the one or more sets of instructions, as indicated by arrow 260. In particular, ALU 220 may identify the specific memory addresses associated with each workload and may write the generated outputs to the memory spaces associated with the respective workload. As illustrated in FIG. 3, outputs associated with each workload may be stored in memory spaces associated with the corresponding workload. For example, Workload_310_output_01 may be stored in memory alongside the instructions and data that correspond to workload 310. Similarly, Workload_320_output_01 may be stored in memory alongside the instructions and data that correspond to workload 320 and Workload_330_output_01 may be stored in memory alongside the instructions and data that correspond to workload 330.

ALU 220 may alert customizable control unit 210 when the one or more sets of instructions associated with the workloads in memory 130 have been executed. Based on receiving the alert from ALU 220, customizable control unit 210 may determine a timeline for releasing the one or more outputs generated during execution of the one or more sets of instructions. To do so, customizable control unit 210 may consider whether additional workloads and sets of instructions to be executed are stored in memory 130, whether ALU 220 is performing at maximum capacity to execute additional or alternative sets of instructions, or the like. Based on determining ALU 220 has sufficient computational capacity to release the outputs, customizable control unit 210 may instruct ALU 220 to release the outputs, as illustrated by arrow 270. Consequently, computing device 110, for example led by ALU 220, may release the generated outputs to I/O devices 160a-160n, as illustrated by arrow 280.

Figure 4:
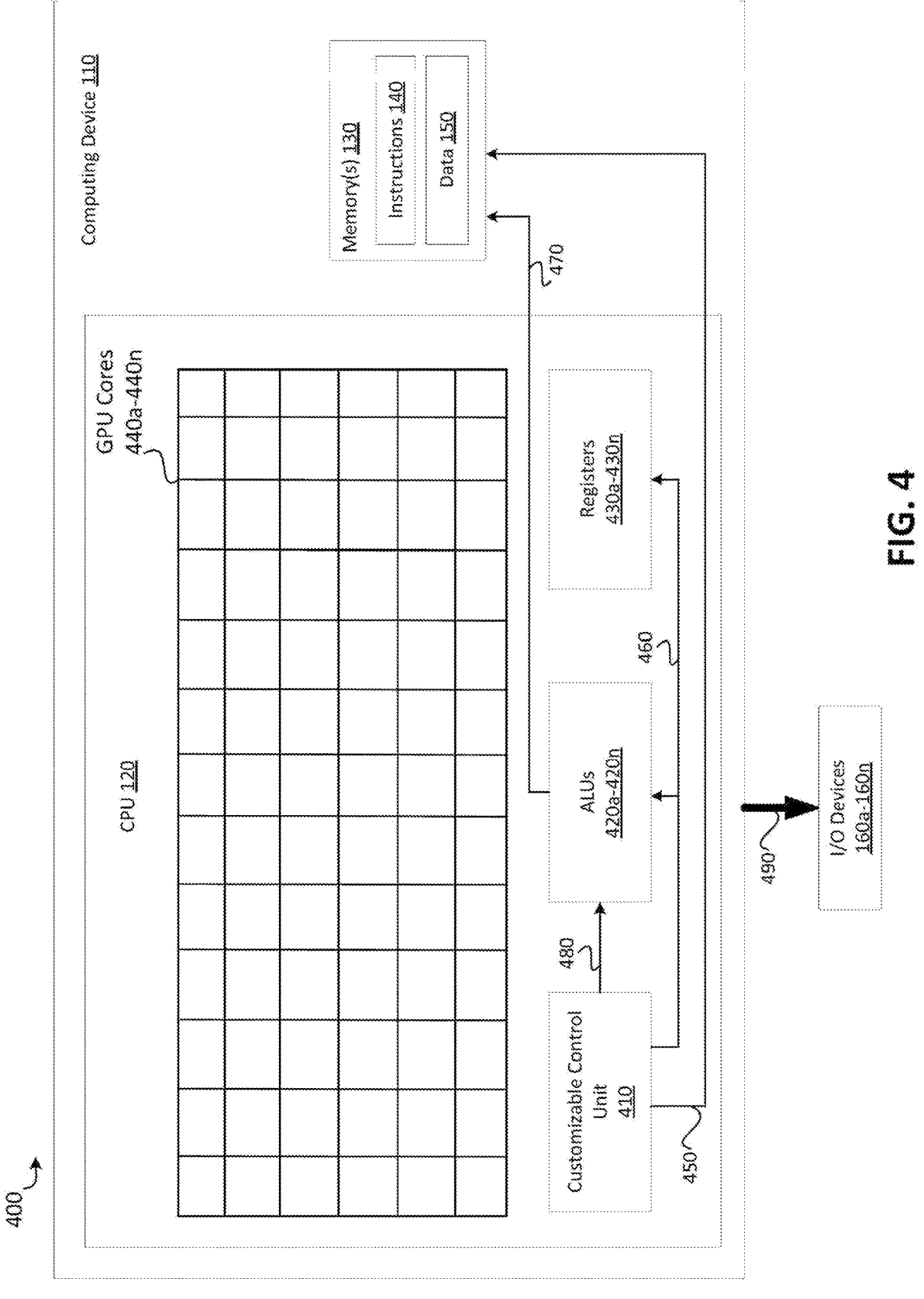
FIG. 4 illustrates an example multi-core CPU configuration comprising the customizable control unit, in accordance with aspects of the disclosure.

FIG. 4 illustrates an example multi-core CPU configuration comprising the customizable control unit, in accordance with aspects of the disclosure. As illustrated in FIG. 4, a multi-core CPU configuration 400 may include customizable control unit 410, ALUs 420a-420n, registers 430a-430n, and GPU cores 440a-440n. CPU 120 may be configured to communicate with memory 130 and I/O devices 160a-160n.

In some implementations, customizable control unit 410 may be configured similarly to customizable control unit 210 within the single-core CPU configuration 200. In particular, customizable control unit 410 may be configured to read, for example from memory 130, one or more sets of instructions to be executed, where the one or more sets of instructions may correspond to different workloads associated with different applications or programs running within CPU 120. In some implementations, the different applications and programs may each be associated with a different GPU core of GPU cores 440a-440n. As such, memory 130 may store one or more sets of instructions generated by GPU cores 440a-440n based on the application or program running therein and the workload that corresponds to the application or program running therein.

In some implementations, customizable control unit 410 may be configured to optimize the execution of a single set of instructions, one or more sets of instructions, or one or more algorithms. Further, customizable control unit 410 may also configure and optimize an input/output (I/O) operation sequence configured to handle the execution of specific workloads, a memory operation sequence configured as needed by workload optimizations, or the like. In some implementations, customizable control unit 410 may schedule read transactions and/or write transactions to be executed on, for example, memory 130 within a single-core CPU configuration or a multi-core CPU configuration.

Customizable control unit 410 may be configured to execute read transactions on memory 130 to read one or more sets of instructions stored within instructions 140, as illustrated by arrow 450. Customizable control unit 410 may parse the one or more sets of instructions to identify a workload associated with the set of instructions, and one or more operations to be executed based on the set of instructions. Further, customizable control unit 410 may execute one or more read transactions on data 150 to identify the data that may be needed to execute the one or more sets of instructions. While not an exhaustive list of workloads, some workloads may include simultaneous multithreading (SMT) operations, pipelined multi-vector load store operations, confidential computation operations, operations that use systolic arrays, operations that use diastolic arrays, algorithmic optimization operations, hybrid system operations, virtual machine (VM) enhancement operations, scheduler operations, memory access operations, multi-stream GPU operations, or the like. The workload examples discussed herein are for illustration purposes only, not limitation.

Based on identifying a workload associated with a set of instructions and the one or more operations to be executed, customizable control unit 410 may generate an instruction execution specification. In some implementations, the instruction execution specification may include instructions for executing the one or more sets of instructions stored in memory 130, where the one or more sets of instructions may be generated by different applications and programs running on GPU cores 440a-440n. However, in some implementations, the instruction execution specification may include instructions for executing one or more sets of instructions associated with particular ALUs and particular GPU cores. As such, customizable control unit 410 may control the execution of the one or more sets of instructions at an increased level of granularity.

In some implementations, the instruction execution specification may be a series of instructions in the form of binary bits that are transmitted to ALUs $420a$-$420n$ and that instruct ALUs $420a$-$420n$ to execute the one or more sets of instructions read from memory $130$ in a prioritized order, as described below. In some implementations, the instruction execution specification may be stored in object code format for direct processing by ALU $220$, or in other formats including interpretable scripts or collections of independent source code modules that are interpreted on demand or compiled in advance. Further, in some implementations, the instruction execution specification may be implemented in one or more hardware components, such as silicone hardware components, one or more field-programmable gate arrays (FPGAs), or the like.

The instruction execution specification may outline each set of instructions read by customizable control unit $410$ from memory $130$ and, by extension, each set of instructions to be executed by CPU $120$. The instruction execution specification may also indicate data read from data $150$ that may be needed to execute each set of instructions. Further, the instruction execution specification may indicate a priority order in which each set of instructions read from memory $130$ should be executed. In some implementations, the priority order may indicate an order in which one or more sets of instructions should be executed, for example, regardless of the GPU core running the application or program associated with the workload.

Customizable control unit $410$ may be configured to dynamically determine a priority level of a set of instructions on a case by case basis based on determining the workload-specific preferences and the workload-specific requirements of the workload to which the set of instructions corresponds. Workload-specific preferences may indicate conditions that may be requested to customize the processing or the execution of a set of instructions. Workload-specific requirements may indicate conditions that may be required for execution of the sets of instructions associated with the different workloads indicated in memory $130$.

Customizable control unit $410$ may use the determined workload-specific preferences and workload-specific requirements to generate the instruction execution specification. Customizable control unit $410$ may weigh the computational and performance preferences and requirements of a workload against that of other workloads in memory $130$ awaiting execution. In doing so, customizable control unit $410$ may consider a number of data flow pipelines across ALUs $420a$-$420n$ that are available to handle the execution of the one or more workloads indicated in memory $130$. In some implementations, customizable control unit $410$ may further consider a number of instructions that may be executed each clock cycle to maximize a number of instruction executions per cycle. Customizable control unit $410$ may balance the computational limits of each clock cycle against storage limits of memory $130$ to ensure sufficient memory to record executed workloads. In some implementations, customizable control unit $410$ may prioritize the one or more sets of instructions based on memory access requirements of each workload. Customizable control unit $410$ may also balance the computational limits of each ALU to identify an ALU capable of the instruction execution. Further, in some implementations, customizable control unit $210$ may prioritize the one or more sets of instructions based on load balancing the front end and back end of CPU $120$.

Customizable control unit $410$ may transmit the instruction execution specification(s), as indicated by arrow $460$. In some implementations, customizable control unit $410$ may transmit the instruction execution specification directly to ALUs $420a$-$420n$ that can handle the execution of one or more sets of instructions. Further, in some implementations, customizable control unit $210$ may write the instruction execution specification(s) to registers $430a$-$430n$. Registers $430a$-$430n$ may be configured to pass data to one or more processors within CPU $120$, such as ALUs $420a$-$420n$. Registers $430a$-$430n$ may pass data to ALUs $420a$-$420n$ based on identifying at least one ALU with sufficient computational capacity to execute the one or more sets of instructions.

In some implementations, the instruction execution specification may instruct ALUs $420a$-$420n$ to execute one or more read transactions on memory $130$ to retrieve the one or more sets of instructions to be executed and the data that may be needed for execution of the one or more sets of instructions. ALUs $420a$-$420n$ may be configured to execute one or more sets of instructions based on the priority order indicated in the instruction execution specification. In some implementations, ALUs $420a$-$420n$ may be configured to identify particular ALUs to handle the execution of one or more sets of instructions. A particular ALU may be able to handle the execution of the one or more sets of instructions associated when the particular ALU has available one or more data flow pipelines needed for the execution. In some implementations, an available data flow pipeline may be needed for execution because of its computational capacity, number of instruction executions available per clock cycle, or the like. ALUs $420a$-$420n$ may determine internally whether at least one ALU is capable of executing the one or more sets of instructions.

ALUs $420a$-$420n$ may write to memory $130$ any outputs generated during the execution of the one or more sets of instructions, as indicated by arrow $470$. In particular, ALUs $420a$-$420n$ may identify the specific memory addresses associated with each workload and may write the generated outputs to the memory spaces associated with the respective workload. ALUs $420a$-$420n$ may alert customizable control unit $410$ when the one or more sets of instructions associated with the workloads in memory $130$ have been executed. Based on receiving the alert from ALUs $420a$-$420n$, customizable control unit $410$ may determine a timeline for releasing the one or more outputs generated during execution of the one or more sets of instructions. Customizable control unit $410$ may consider whether additional workloads and sets of instructions to be executed are stored in memory $130$, whether ALUs $420a$-$420n$ are performing at maximum capacity to execute additional or alternative sets of instructions, whether ALUs $420a$-$420n$ are performing at maximum capacity to carry out operations associated with the program or applications running in each of GPU cores $440a$-$440n$, or the like. Based on determining ALUs $420a$-$420n$ have sufficient computational capacity to release the outputs, customizable control unit $410$ may instruct ALUs $420a$-$420n$ to release the outputs, as illustrated by arrow $480$. Consequently, computing device $110$, for example led by ALUs $420a$-$420n$, may release the generated outputs to I/O devices $160a$-$160n$, as illustrated by arrow $490$.

FIG. 5 illustrates a flow diagram for an example method of processing workload requests using the customizable control unit, in accordance with aspects of the disclosure. The operations described herein are presented in the current order by way of example, and the order is not meant to be limiting. Moreover, operations may be omitted from or added to the example method. The method and techniques described herein may be performed by one or more computing devices or components therein, such as a customized processor control unit within a single-core CPU configuration, a customized processor control unit within a multi-core CPU configuration, or the like.

At block 501, the customized processor control unit may read from memory one or more sets of instructions to be executed, where each set of instructions may correspond to a different workload. A workload may be a categorization or grouping of operations associated with an application or program running on a computing device. The one or more sets of instructions may be stored in memory, such as memory 130 illustrated in FIG. 1, and may be accessed by the customized processor control unit via one or more read transactions executed on the memory.

At block 502, the customized processor control unit may determine, for the one or more sets of instructions, a priority order for executing the one or more sets of instructions based on workload-specific preferences and workload-specific requirements, and may determine a data flow pipeline configured to handle the processing. The workload-specific preferences and workload-specific requirements may be included in an instruction execution specification. The instruction execution specification may be a series of instructions in the form of binary bits that may be used to schedule the execution of the one or more sets of instructions read from memory 130 in a prioritized order. The instruction execution specification may be based on the workload-specific preferences and the workload-specific requirements determined by the customized processor control unit. Workload-specific preferences may indicate conditions that may be requested to customize the processing or the execution of a set of instructions. Workload-specific requirements may indicate conditions that may be required for execution of the sets of instructions associated with the different workloads.

To generate the instruction execution specification, the customized processor control unit may weigh the computational and performance preferences and requirements of a workload against that of other workloads in memory 130 awaiting execution. The customized processor control unit may consider a number of data flow pipelines or CPU pipelines that are available to handle the execution of one or more workloads. In some implementations, the customized processor control unit may further consider a number of instructions that may be executed each clock cycle to maximize a number of instruction executions per cycle. The customized processor control unit may balance the computational limits of each clock cycle against storage limits of the memory, such as memory 130, to ensure sufficient memory to record executed workloads. In some implementations, the customized processor control unit may prioritize the one or more sets of instructions based on memory access requirements of each workload. In implementations where the customized processor control unit is configured within a multi-core CPU configuration, the customized processor control unit may also balance the computational limits of each ALU therein to identify an ALU capable of executing the one or more sets of instructions.

At block 503, the customized processor control unit may transmit instructions to process the one or more sets of instructions based on the determined priority order. In implementations where the customized processor control unit is configured within a single-core CPU configuration, the customized processor control unit may transmit the instruction execution specification to a single ALU or one or more registers. For example, as illustrated by arrow 250 in FIG. 2, customizable control unit 210 may transmit the instruction execution specification to ALU 220 and/or registers 230a-230n. However, in implementations where the customized processor control unit is configured within a multi-core CPU configuration, the customized processor control unit may transmit the instruction execution specification to one or more ALUs or one or more registers. For example, as illustrated by arrow 460 in FIG. 4, customizable control unit 410 may transmit the instruction execution specification to ALUs 420a-420n and/or registers 430a-430n. The instruction execution specification may instruct the one or more ALUs to execute read transactions on the memory to read the one or more sets of instructions to be executed as well as data that may be needed to execute the one or more sets of instructions.

In some implementations, the one or more ALUs may execute the one or more sets of instructions in accordance with the instruction execution specification and may transmit, to the customized processor control unit, a notification indicating completion of the instruction execution.

In some implementations, the customized processor control unit may determine whether further instructions should be transmitted to the one or more ALUs and/or one or more registers. For example, the customized processor control unit may further instruct the one or more ALUs to release any outputs generated during the execution of the one or more sets of instructions. In particular, the customized processor control unit may instruct the one or more ALUs to release the outputs to one or more input/output devices, such as I/O devices 160a-160n illustrated in FIG. 1, that may be connected, either wired or wirelessly, the computing device housing the customized processor control unit, such as computing device 110.

Figure 6:
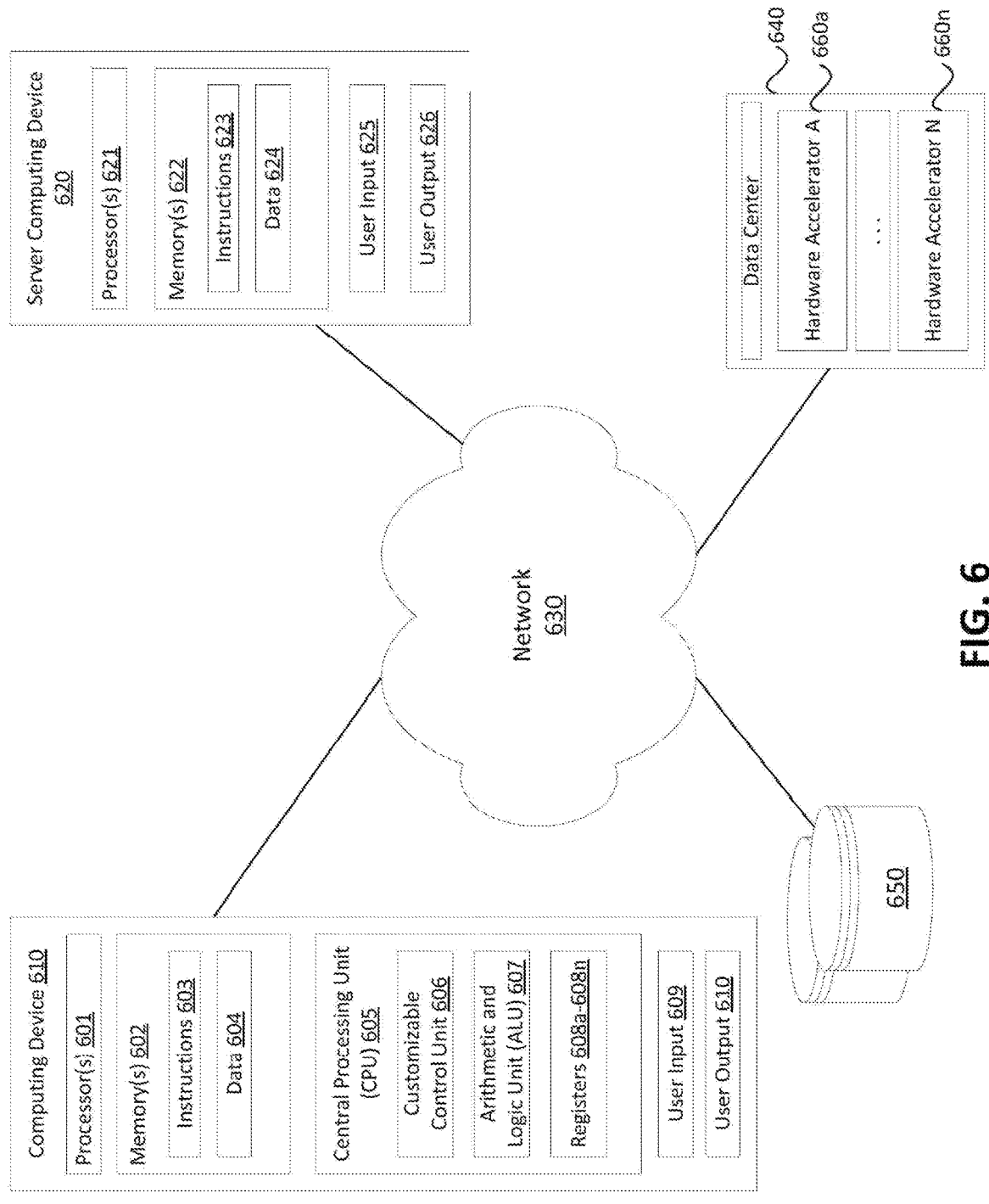
FIG. 6 illustrates a block diagram of an example computing environment within which the customizable control unit may be used to execute workload instructions, in accordance with aspects of the disclosure.

FIG. 6 illustrates a block diagram of an example computing environment within which a customizable processor control unit may be used to execute workload instructions, in accordance with aspects of the disclosure. The customizable processor control unit may be implemented on one or more computing devices having one or more processors in one or more locations, such as in computing device 610 and server computing device 620. Computing device 610 and server computing device 620 may be communicatively coupled to one or more storage devices over a network. The storage devices can be a combination of volatile and non-volatile memory and can be at the same or different physical locations than the computing devices. For example, the storage devices can include any type of non-transitory computer readable medium capable of storing information, such as a hard-drive, solid state drive, tape drive, optical storage, memory card, ROM, RAM, DVD, CD-ROM, write-capable, and read-only memories.

Computing device 610 may include one or more processors and memory, such as processor(s) 601, memory(s) 602 (referred to herein as memory 602), and CPU 605. Memory(s) 602 may include instructions 603 and data 604. CPU 605 may include customizable control unit 606, ALU 607, and registers 608a-608n. Computing device 610 may also include a user input and a user output, such as user input 609 and user output 610.

Memory 602 may store information accessible by the processors, including instructions that can be executed by the processors. Memory 602 may also include data that can be read, retrieved, manipulated, or stored by the processors. Memory 602 may be a type of non-transitory computer readable medium capable of storing information accessible by the processors, such as volatile and non-volatile memory. The processors can include one or more central processing units (CPUs), graphic processing units (GPUs), field-programmable gate arrays (FPGAs), and/or application-specific integrated circuits (ASICs), such as tensor processing units (TPUs).

Instructions 603 may include one or more instructions that, when executed by the processors, cause the one or more processors to perform actions defined by the instructions. Instructions 603 may be stored in object code format for direct processing by the processors, or in other formats including interpretable scripts or collections of independent source code modules that are interpreted on demand or compiled in advance. Instructions 603 may include instructions for executing one or more sets of instructions associated with one or more workloads.

Data 604 may be read, retrieved, stored, or modified by the processors in accordance with the instructions. Data 604 may be stored in computer registers, in a relational or non-relational database as a table having a plurality of different fields and records, or as JSON, YAML, proto, or XML documents. Data 604 may also be formatted in a computer-readable format such as, but not limited to, binary values, ASCII, or Unicode. Moreover, data 604 may include information sufficient to identify relevant information, such as numbers, descriptive text, proprietary codes, pointers, references to data stored in other memories, including other network locations, or information that is used by a function to calculate relevant data.

CPU 605 may be configured to execute the one or more sets of instructions associated with the one or more workloads. In particular, customizable control unit 606 may execute a read transaction on memory 602 to read the one or more sets of instructions stored therein and awaiting execution. Customizable control unit 606 may determine one or more workloads that correspond to the one or more sets of instructions, and may determine workload-specific preference and workload-specific requirements. Customizable control unit 606 may use the workload-specific preference and the workload-specific requirements to determine a priority order in which the one or more sets of instructions should be executed, and may instruct ALU 607 to execute the one or more sets of instructions according to the priority order.

Customizable control unit 606 may receive, from ALU 607, a notification or alert indicating completion of the execution of one or more sets of instructions. Accordingly, customizable control unit 606 may instruct ALU to release any outputs generated during the execution of the one or more sets of instructions.

ALU 607 may be configured to receive instructions from customizable control unit 606. ALU may execute the one or more sets of instructions stored in memory 602 and may alert customizable control unit 606 upon completion. ALU 607 may receive, from customizable control unit 606, instructions to release any output generated during the instruction execution. Customizable control unit 606 may release any generated outputs to input/output devices (not pictured) associated with computing device 610.

In some implementations, registers 608a-608n may be configured to hold the execution instructions generated by customizable control unit 606. Registers 608a-608n may further be configured to pass the execution instructions to ALU 607.

User input 609 may include any appropriate mechanism or technique for receiving input, such as keyboard, mouse, mechanical actuators, soft actuators, touchscreens, microphones, and sensors. In some implementations, user input

609 may be used to request execution of the one or more sets of instructions associated with one or more workloads.

User output 610 may be used to display one or more outputs generated during execution of the one or more sets of instructions.

Server computing device 620 may also be configured similarly to computing device 610, with one or more processors, memory, instructions, and data, such as processor(s) 621, memory(s) 622, instructions 623, and data 624. Server computing device 620 may also include a user input and a user output, such as user input 625 and user output 626. User input 625 may include any appropriate mechanism or technique for receiving input, such as keyboard, mouse, mechanical actuators, soft actuators, touchscreens, microphones, and sensors.

Server computing device 620 may be configured to transmit data to computing device 610, and computing device 610 may be configured to display at least a portion of the received data on a display implemented as part of user output 610. User output 626 may also be used for displaying an interface between computing device 610 and server computing device 620. User output 626 can alternatively or additionally include one or more speakers, transducers or other audio outputs, a haptic interface or other tactile feedback that provides non-visual and non-audible information to the platform user of the server computing device 620.

Although FIG. 6 illustrates the processors and the memories as being within the computing devices, components described herein can include multiple processors and memories that can operate in different physical locations and not within the same computing device. For example, some of the instructions and the data can be stored on a removable SD card and others within a read-only computer chip. Some or all of the instructions and data can be stored in a location physically remote from, yet still accessible by, the processors. Similarly, the processors can include a collection of processors that can perform concurrent and/or sequential operation. The computing devices can each include one or more internal clocks providing timing information, which can be used for time measurement for operations and programs run by the computing devices.

Computing device 610 can be connected over network 630 to a data center housing any number of hardware accelerators, such as data center 640 housing hardware accelerators 660a-660n. Data center 640 can be one of multiple data centers or other facilities in which various types of computing devices, such as hardware accelerators, are located. Computing resources housed in the data center can be specified for deploying models or workloads that may use the customizable processor control unit to schedule execution of one or more sets of instructions associated with the workloads, as described herein.

Computing device 610 may be configured to receive requests to process data from server computing device 620 on computing resources in the data center. For example, the environment can be part of a computing platform configured to provide a variety of services to users, through various user interfaces and/or application programming interfaces (APIs) exposing the platform services. The variety of services can include using a customizable processor control unit to dynamically analyze one or more sets of instructions associated with one or more workloads and to schedule execution of the one or more sets of instructions based on priority levels associated with each set of instructions. Server computing device 620 may transmit input data that may be needed to execute the one or more sets of instructions associated with the workloads. Computing device 610 may receive the input data, use the input data during the execution of the one or more sets of instructions, and transmit to server computing device 620 one or more outputs generated during the execution of the one or more sets of instructions.

Data transmitted between computing device 610 and server computing device 620 and across network 630 may be stored in database 650.

As other examples of potential services provided by a platform implementing the environment, computing device 610 may maintain a variety of models or workloads in accordance with different constraints available at data center 640. For example, computing device 610 may maintain different families for deploying models on various types of TPUs and/or GPUs housed in data center 640 or otherwise available for processing.

Computing device 610, server computing device 620, and data center 640 may be capable of direct and indirect communication over network 630. For example, using a network socket, server computing device 620 may connect to a service operating in data center 640 through an Internet protocol. Computing device 610 and server computing device 620 may set up listening sockets that may accept an initiating connection for sending and receiving information. Network 630 itself may include various configurations and protocols including the Internet, World Wide Web, intranets, virtual private networks, wide area networks, local networks, and private networks using communication protocols proprietary to one or more companies. Network 630 may support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. Network 630 may, in addition or alternatively, also support wired connections between the devices and the data center, including over various types of Ethernet connection.

It is understood that the aspects of the disclosure may be implemented according to a variety of different configurations and quantities of computing devices, including in paradigms for sequential or parallel processing, or over a distributed network of multiple devices. In some implementations, aspects of the disclosure may be performed on a single device connected to hardware accelerators configured to perform clock synchronization at scale.

The method described herein may be an iterative process in that the described steps may be performed each time the customized processor control unit executes a read transaction on the memory and determines that the memory includes one or more sets of instructions to be executed. In some implementations, the instruction execution specification may be generated for the one or more sets of instructions to be executed each time the customized processor control unit executes a read transaction on the memory.

Further, the method described herein may be performed dynamically in that the customized processor control unit may determine workload-specific preferences and workload-specific requirements on a case-by-case basis and based on the one or more sets of instructions to be executed.

The foregoing aspects of this technology offer a method of decoupling control path configurations or memory access configurations where complex configurations may be possible based on customizing various accelerators and data flows. In particular, the described customizable and programmable control unit may provide for customizing how different workloads are processed on a computing device without requiring modifications to the software stack operating on the computer device. Namely, the customizable and programmable control unit may be configured to adapt to novel workloads and to determine a priority order in which sets of instructions associated with the novel workloads should be executed. Using the customizable and programmable control unit may avoid the need for control paths to be hard coded into silicon processors, which may decrease processing and manufacturing costs associated with the processors.

Aspects of this technology further provide for a novel method of enabling advanced artificial intelligence (AI) algorithms with speed and configurability, and without the need for hardcoded hardware. Further, the customizable and programmable control unit may allow different AI architectures to exist on a single processor and/or chip, where the AI architectures may include transformers, neural operators, disentangled variational encoders, reinforcement learning, and generative and diffusion networks, such as systolic arrays. Aspects of this technology further allow for serving varying cloud-based computing needs that might not be offered in existing hyperscaler stacks.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed on it software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components, or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back-end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the implementations should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method for processing workload instructions using a customizable processor control unit in a central processing unit (CPU), the method comprising:

reading, by the customizable processor control unit and from memory, one or more sets of instructions to be executed, wherein each set of instructions corresponds to a different workload;

determining, by the customizable processor control unit and for the one or more sets of instructions:

a priority order for executing the one or more sets of instructions by comparing computational and performance workload-specific preferences and computational and performance workload-specific requirements for each set of instructions; and a data flow pipeline configured to handle processing the one or more sets of instructions;

scheduling, by the customizable processor control unit, execution of the one or more sets of instructions based on the priority order; and transmitting instructions to process the one or more sets of instructions based on the determined priority order.

2. The method of claim 1, further comprising determining, by the customizable processor control unit and for the one or more sets of instructions:

an input/output (I/O) operation sequence configured to handle specific workloads; and a memory operation sequence configured as needed by workload optimization.

3. The method of claim 1, wherein the customizable processor control unit controls a single core CPU architecture or a multi-core CPU, graphics processing unit (GPU), tensor processing unit (TPU), or variable processing unit (xPU) architecture.

4. The method of claim 1, wherein a workload corresponds to an application running on a computing device, and wherein the computing device is configured to generate the one or more sets of instructions.

5. The method of claim 1, further comprising determining, by the customizable processor control unit, the workload-specific preferences comprising:

conditions for allowing access to memory spaces storing data needed to process the one or more sets of instructions;

conditions for satisfying operation performance thresholds;

conditions for scheduling execution of the one or more sets of instructions; and conditions for maintaining an overall operation configuration.

6. The method of claim 1, further comprising determining, by the customizable processor control unit, the workload-specific requirements comprising:

one or more data storage configurations needed for execution of the one or more sets of instructions;

throughput optimization for input/output (I/O) processors associated with the one or more sets of instructions;

one or more control path configurations; and a level of parallelism needed for execution of the one or more sets of instructions.

7. The method of claim 1, wherein the data flow pipeline configured to handle the processing corresponds to:

one or more arithmetic logic units (ALUs) configured to execute the one or more sets of instructions; and one or more memory locations configured to store data that is required to execute the one or more sets of instructions and to store one or more outputs of an executed set of instructions.

8. The method of claim 7, further comprising transmitting, by the customizable processor control unit, instructions to release the one or more outputs to a computing device that requested execution of the set of instructions.

9. A computing device for scheduling execution of workload instructions, the computing device comprising:

a memory; and a central processing unit (CPU) comprising a customizable processor control unit and an arithmetic logic unit (ALU), wherein the customizable processor control unit is configured to:

read, from memory, one or more sets of instructions to be executed, wherein each set of instructions corresponds to a different workload;

determine, for the one or more sets of instructions:

a priority order for executing the one or more sets of instructions by comparing computational and performance workload-specific preferences and computational and performance workload-specific requirements; and

24 a data flow pipeline configured to handle processing the one or more sets of instructions; and transmit, to the ALU, instructions to process the one or more sets of instructions based on the determined priority order.

10. The computing device of claim 9, wherein a workload corresponds to an application running on the computing device, and wherein the computing device is configured to generate the one or more sets of instructions.

11. The computing device of claim 9, wherein the customizable processor control unit is further configured to determine the workload-specific preferences comprising:

conditions for allowing access to memory spaces storing data needed to process the one or more sets of instructions;

conditions for satisfying operation performance thresholds;

conditions for scheduling execution of the one or more sets of instructions; and conditions for maintaining an overall operation configuration.

12. The computing device of claim 9, wherein the customizable processor control unit is further configured to determine the workload-specific requirements comprising:

one or more data storage configurations needed for execution of the one or more sets of instructions;

throughput optimization for input/output (I/O) processors associated with the one or more sets of instructions;

one or more control path configurations; and a level of parallelism needed for execution of the one or more sets of instructions.

13. The computing device of claim 9, wherein the customizable processor control unit is further configured to transmit, to the ALU, instructions in order or out of order to release one or more outputs of an executed set of instructions to the computing device that requested execution of the set of instructions.

14. The computing device of claim 9, wherein the customizable processor control unit is further configured to schedule execution of the one or more sets of instructions based on the priority order.

15. A non-transitory computer readable storage medium storing instructions that, when executed by a customizable processor control unit, cause the customizable processor control unit to:

read, from memory, one or more sets of instructions to be executed, wherein each set of instructions corresponds to a different workload;

determine, for the one or more sets of instructions:

a priority order for executing the one or more sets of instructions by comparing computational and performance workload-specific preferences and computational and performance workload-specific requirements; and a data flow pipeline configured to handle processing the one or more sets of instructions; and transmit instructions to process the one or more sets of instructions based on the determined priority order.

16. The non-transitory computer readable storage medium of claim 15, wherein the customizable processor control unit is further configured to determine the workload-specific preferences comprising:

conditions for allowing access to memory spaces storing data needed to process the one or more sets of instructions;

conditions for satisfying operation performance thresholds;

conditions for scheduling execution of the one or more sets of instructions; and conditions for maintaining an overall operation configuration.

* * * * *